United States Patent [19]
Nicholson

[11] 3,843,833
[45] Oct. 22, 1974

[54] TWO-PIECE SCREW-IN ADJUSTABLE BUSHING

[75] Inventor: John H. Nicholson, Ferndown, England

[73] Assignee: Heyman Manufacturing Company, Kenilworth, N.J.

[22] Filed: May 9, 1973

[21] Appl. No.: 358,644

[30] Foreign Application Priority Data
May 10, 1972 Great Britain.................. 21975/72

[52] U.S. Cl...................... 174/153 G, 16/2, 248/56
[51] Int. Cl......................... H01b 17/26, F16l 5/00
[58] Field of Search.......... 174/65 R, 65 G, 81, 135, 174/152 G, 153 R, 153 G, 167; 16/2; 248/56; 339/103 B

[56] References Cited
UNITED STATES PATENTS

| | | | |
|---|---|---|---|
| 1,235,184 | 7/1917 | Casbarian | 16/2 X |
| 2,234,640 | 3/1941 | Austin, Jr. | 174/81 X |
| 2,337,781 | 12/1943 | Stoker | 174/81 X |
| 3,365,216 | 1/1968 | Babylon | 248/56 X |

FOREIGN PATENTS OR APPLICATIONS

| | | | |
|---|---|---|---|
| 1,221,728 | 1/1960 | France | 174/153 G |

Primary Examiner—Laramie E. Askin
Attorney, Agent, or Firm—M. Arthur Auslander

[57] ABSTRACT

The present invention relates to an electrical insulating and strain relief bushing which is intended to be inserted in an aperture in a mounting member, and is adapted to receive and lock an electrical conductor against movement therethrough, while electrically insulating the conductor from the mounting member. The bushing comprises first and second tubular body portions connectable together by screwing one into the other, both body portions being provided with passages which, together, define an electrical conductor receiving passage extending through the bushing. The configuration of the body portion is such that, when they are screwed together, the cross section of said conductor receiving passage is reduced to grip the conductor. The bushing includes resilient means which, when the bushing is engaged into an aperture in the mounting member, locks the bushing to the mounting member.

9 Claims, 7 Drawing Figures

PATENTED OCT 22 1974 3,843,833
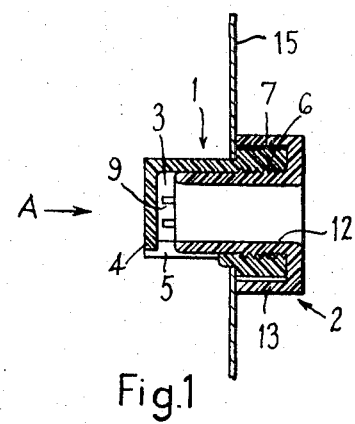
Fig.1
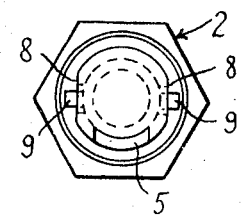
Fig.3
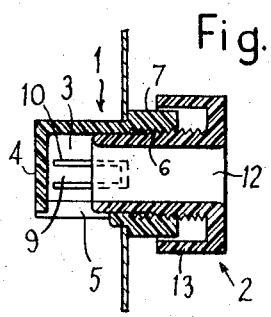
Fig.2
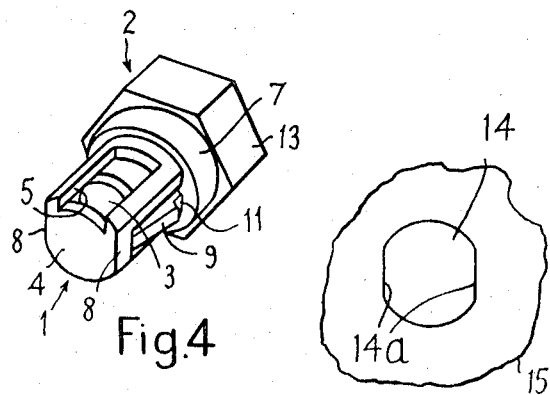
Fig.4
Fig.5
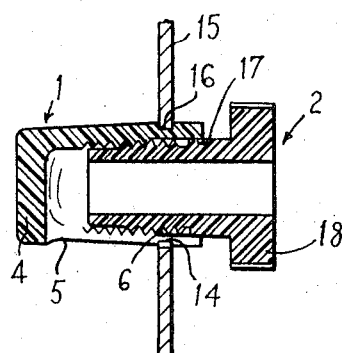
Fig.6
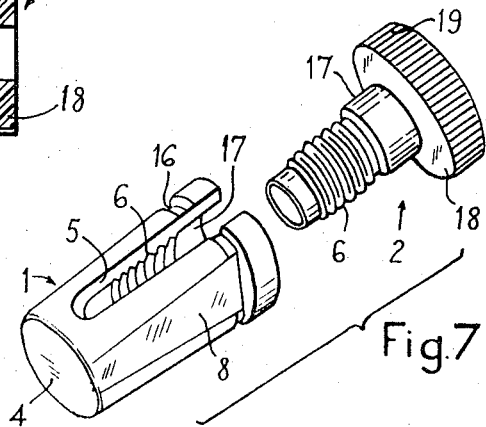
Fig.7

TWO-PIECE SCREW-IN ADJUSTABLE BUSHING

The present invention relates to a bushing or grommet of the type which is intended to be inserted in an aperture in a mounting member, and is adapted to receive and lock an electrical conductor against movement therethrough, whilst electrically insulating the conductor from the mounting member. Such a bushing or grommet will hereinafter be referred to as "a bushing of the type specified".

It is an object of the present invention to provide a bushing of the type specified which will accommodate and lock electrical conductors of different dimensions.

To this end, the present invention consists in a bushing of the type specified, comprising first and second tubular body portions connected or connectable together one within the other, both body portions being provided with passages which, together, define an electrical conductor-receiving passage extending through the bushing, the two body portions, in use of the bushing, being mutually telescopically adjustable, thereby to vary the cross-section of said conductor-receiving passage, the bushing including means adapted to secure the bushing within an aperture in a mounting member.

The first and second body portions may be molded from a synthetic plastic material, and the second body portion may be screw-threaded into the passage of the first body portion. The first body portion may include a transverse wall, defining part of the passage therein, the spacking between the transverse wall and the inner end of the second body portion being increased or decreased by screwing the second body portion respectively into or out of the first body portion, thereby reducing or increasing the cross-sectional area of the conductor-receiving passage in the bushing.

In order that the invention may be more readily understood, reference will now be made to the accompanying drawings, in which:

FIGS. 1 and 2 are transverse sections through a strain relief bushing according to one embodiment of the invention, shown in two differently adjusted positions;

FIG. 3 is an end view of the bushing in the direction of the arrow A in FIG. 1;

FIG. 4 is a perspective view of the bushing shown in FIGS. 1 to 3;

FIG. 5 is a fragmentary plan view of a mounting member showing the bushing-receiving aperture therein;

FIG. 6 is a transverse section through a second embodiment of bushing; and

FIG. 7 is an exploded perspective view of the bushing of FIG. 6.

Referring to the drawings, the strain relief bushing is formed from an electrically insulating material, for example molded from a resilient synthetic plastic material such as Nylon. The bushing basically consists of first and second generally cylindrical, tubular body portions 1 and 2 respectively.

The first body portion 1 has a passage 3 extending axially thereinto. At its right hand end, the passage 3 opens longitudinally of the body portion 1, whilst the other longitudinal end of the passage is closed by a transverse wall 4, the passage opening transversely of the body portion 1 via a lateral slot 5. The right hand end of the passage is internally threaded at 6, and around the threaded portion 6 is an external annular flange 7. The body portion 1 is formed externally with a pair of diametrically opposed flat surfaces 8, each provided with a longitudinally extending resilient finger 9 defined by a generally U-shaped slot 10 as shown in FIG. 2. Each finger 9 extends from its root towards the flange 7, where it terminates in a stepped end face 11 (FIG. 4). As will be apparent from FIG. 4, the outer surface of each finger 9 diverges from its associated flat surface 8 towards the flange 7.

The second body portion 2 has a passage 12 extending axially therethrough from end to end. At its right hand end, the body portion 2 is molded integrally with a hexagonal head or nut 13. The head 13 is hollow and forms with the body portion 2 a longitudinally opening annular recess for receiving the flange 7 as shown, the external surface of the body portion 2 lying within this recess being screw-threaded to cooperate with the internally threaded portion 6 of the body portion 1.

In operation, the first body portion 1, with the second body portion detached therefrom, is pressed into an aperture such as the aperture 14 in the mounting member 15, shown in FIG. 5. This mounting member may be a chassis of a piece of electrical equipment. Insertion is effected in a direction from right to left in FIGS. 1 and 2, and as the body portion 1 is so inserted, with the flats 8 aligned with the flats 14a of the aperture 14, the outer inclined surfaces of the spring fingers 9 are engaged, and the fingers resiliently deflected inwardly, by the flats 14a. When the forward face of the mounting member 15 buts against the flange 7, the fingers snap out behind the rearward face of the mounting member, cooperating therewith adjacent the aperture, thereby positively locking the body portion 1 in the aperture 14.

An electrical conductor, cable, flex or the like (not shown), is then fed through the passage 12 in the body portion 2, through the passage 3 in the body portion 1, and out of the slot 5. The body portion 2 is then screwed into the body portion 1 until the conductor is kinked, compressed and gripped between the transverse wall 4 and adjacent inner end of the body portion 2, thus positively locking the conductor against longitudinal movement relative to the bushing, and therefore the mounting member 15, should the conductor be pulled or otherwise tensioned. Tightening of the second body portion may be effected by gripping and turning the hexagonal head 13 either by hand, or with a spanner, whilst rotation of the first body portion is prevented by engagement of the flats 8 and 14a. Due to the wide and stepless range of adjustments which may be effected between the two body portions, the limits of which are shown in FIGS. 1 and 2, a wide variety of sizes of conductors may be accommodated and effectively anchored by the same bushing.

Due to the provision of the transverse wall 4 and slot 5, the conductor will enter the right hand end of the bushing longitudinally, and will exit generally radially through the slot 5.

As will be apparent from FIGS. 1 and 2, when the body portions are screwed together, the inner unthreaded end of the second body portion will underlie the fingers 9, positively preventing them from being inadvertently depressed to release the bushing from the aperture in the mounting member. However, the bushing may be simply removed from the aperture if required, by unscrewing the body portion 2 and then depressing the fingers 9.

The bushing shown in FIGS. 6 and 7 differs from that shown in FIGS. 1 to 4 in that the body portion 1 is tapered and the spring fingers 9 and flange 7 are replaced by an interrupted annular groove 16 in the first body portion 1. In addition, the slot 5 is extended longitudinally away from the transverse wall 4 so as to open through the opposite end of the body portion 1, thus imparting radial resilience to the latter.

As the first body portion 1 is inserted into the aperture 14, with the second body portion 2 removed, the flats 8 and 14a engage, and the first body portion is resiliently compressed, until the mounting member 15 overlies the groove 16, whereafter the compressed body portion 1 is free to snap outwardly, trapping the edges of the aperture 14 in the groove 16. Although, with the second body portion 2 removed, the first body portion 1 may be simply compressed to allow it to be removed from the aperture 14, when the second body portion 2 is screwed into the portion 1, such compression, and therefore removal, is positively prevented by cooperation of the threads 6 and/or the surfaces 17.

In this second embodiment, the hollow hexagonal head 13 is replaced by a solid circular head 18, which may be knurled or otherwise roughened at 19 to facilitate gripping and turning by hand.

The bushings herein described are efficient, compact, and are comparatively simple and cheap to produce since they each comprise only two separate parts.

It will be understood that various modifications may be made without departing from the scope of the present invention as defined in the appended claims.

For example, the shape, size and dimensions of the bushings, and in particular of the first and second body portions may be varied to suit different applications and different conductor sizes.

The body portions may be made from the same or different synthetic plastic materials, which may be Nylon or any other suitable material.

The screw threads 6 may be replaced by other means enabling relative adjustment between the two body portions, for example by resilient snap-acting ribs or serrations.

The slot 5 in the FIGS. 1 to 4 embodiment may open longitudinally through the flange 7 as in FIGS. 6 and 7, and likewise, the slot 5 in the FIGS. 6 and 7 embodiment may be longitudinally closed as in FIGS. 1 to 4, in which event the first body portion is preferably, but not essentially, formed with one or more slots, or weakened, to enhance the radial resilience thereof.

In order to enhance the anchorage of the conductor within the bushing, the conductor-engaging surface of the transverse wall 4, and/or the inner end of the second body portion 2 may be knurled, ribbed, roughened, serrated or otherwise formed.

Means, such as a flexible tie or strap, may be provided to prevent the two body portions from being completely separated even when the second body portion is fully unscrewed and withdrawn from the first body portion.

The bushing may also be provided with an anchor strap or tie, attached to or integral with one or both of the body portions, by means of which the bushing may be attached to the mounting member, thus preventing separation of the bushing from the mounting member even when the bushing is removed from its aperture.

What I claim is:

1. An electric bushing of the type intended to be inserted in an aperture in a mounting member and adapted to receive and lock an electrical conductor against movement therethrough whilst electrically insulating the conductor from the mounting member, comprising first and second generally tubular body portions connected together the second within the first, both body portions being provided with passages which together define an electrical conductor receiving passage extending through the two body portions of the bushing, said first body portion including a transverse wall, said first body portion including a longitudinally extending slot adapted to receive an electrical conductor therethrough, said first and second body portions being mutually telescopically adjustable to vary the cross section of said conductor receiving passage between said transferse wall and said second body portion, and said bushing including means on said first body protion to secure the bushing within an aperture in said mounting member.

2. A bushing as claimed in claim 1 wherein said bushing securing means comprises an external flange on one end of said first body portion away from said transverse wall, and at least one resilient locking member adjacent said flange projecting externally of said first body portion, said resilient locking member cooperable to engage said mounting member and hold said mounting member between said flange and said at least one resilient locking member.

3. A bushing as claimed in claim 2, wherein a pair of diametrically opposed resilient locking members are provided, each comprising a longitudinally extending resilient finger defined by a generally U-shaped slot in the first body portion, each finger extending from an integral connection with the first body portion towards the flange, terminating adjacent the flange, and diverging outwardly from the external surface of the first body portion towards the flange.

4. A bushing as claimed in claim 3, wherein each finger terminates adjacent the flange in a stepped end face.

5. A bushing as claimed in claim 2, wherein the first body portion is formed externally with a pair of diametrically opposed flat surfaces, each provided with one of said resilient locking members.

6. A bushing as claimed in claim 1 wherein said first portion is flexible inward toward its passage.

7. A bushing as claimed in claim 1 wherein the second body portion includes an external integral flange adjacent the end of the passage therein normally away from the transverse wall of said first body portion.

8. A bushing as claimed in claim 7, including an external flange on said first body portion, and said flanges of the first and second body portions are annular, and the flange of the second body portion is recessed to accommodate the flange of the first body portion.

9. A bushing as claimed in claim 1, wherein the first and second body portions are, respectively, internally and externally screw-threaded whereby the second body portion is screw-threadable into the passage of the first body portion.

* * * * *